United States Patent

Iwata et al.

[11] Patent Number: 5,862,056
[45] Date of Patent: Jan. 19, 1999

[54] METHOD AND APPARATUS FOR DISPLAY OF MACHINING STATUS

[75] Inventors: Yoshifumi Iwata; Kiyoshi Kuchiki, both of Aichi, Japan

[73] Assignee: Mitsubishi Denki Kabushiki Kaisha, Tokyo, Japan

[21] Appl. No.: 936,007

[22] Filed: Aug. 27, 1992

[30] Foreign Application Priority Data

Aug. 30, 1991 [JP] Japan ................................. 3-219964

[51] Int. Cl.⁶ .............................. G06F 19/00; G06G 7/66
[52] U.S. Cl. ................ 364/474.26; 364/188; 364/474.27
[58] Field of Search ........................ 364/474.26, 474.27, 364/188, 191

[56] References Cited

U.S. PATENT DOCUMENTS 4,591,998  5/1986  Kuperman et al. ...................... 364/521

*Primary Examiner*—Reba I. Elmore
*Assistant Examiner*—R. Dolan
*Attorney, Agent, or Firm*—Sughrue, Mion, Zinn, Macpeak & Seas, PLLC

[57] ABSTRACT

A numerical control machining apparatus, having a section for reading out and analyzing machining programs from a storage section to control the axis drive section of a machine tool, also can display the quantity and direction of movement for each axis on a display section. The axis movement is identified by symbols that reflect a pre-set correspondence between the direction of movement instruction to each axis of the machine tool and the direction of the actual movement of each axis of the machine tool seen by an operator. That correspondence is stored beforehand when an operator inputs instructions for the various movements of the axes and the operator examines the machine's response and identifies a symbol that corresponds to that response, such as an arrow whose orientation corresponds to an observed movement direction. Thereafter, when the programmed operation is conducted, the presence or absence of axis movement, the quantity and the direction thereof as seen by the operator is determined and, on the basis of the previously input data, an axis movement symbol creation section selects from storage the visual symbols that respectively match the direction etc. of the movement of each axis. These symbols are displayed on the display section to indicate the current position of each axis, and the direction of the actual movement of each axis as seen by the operator.

17 Claims, 8 Drawing Sheets

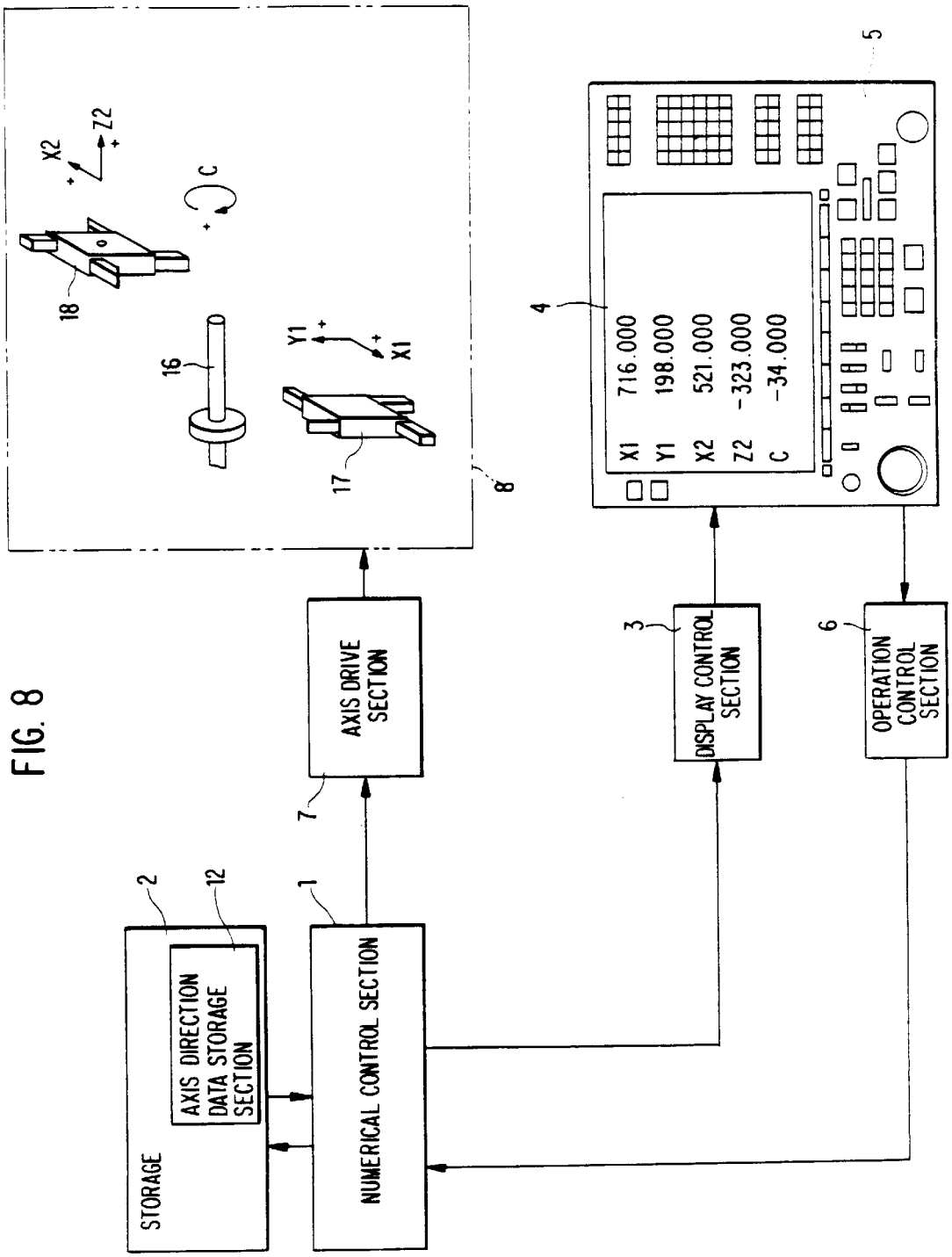

METHOD AND APPARATUS FOR DISPLAY OF MACHINING STATUS

BACKGROUND OF THE INVENTION

1. Field of the Invention

The present invention relates to a machining apparatus, such as a numerically controlled apparatus (hereinafter, NC apparatus) or programmably controlled apparatus (hereinafter, PC apparatus) that controls the machining operations of a machine tool and, in particular, to an NC apparatus or PC apparatus, including method therefor, which is capable of displaying in an easily identifiable manner the operation of each axis of a machine tool.

2. Description of the Related Art

FIG. 8 is a view illustrating the hardware configuration of a conventional NC apparatus and the main sections of the numerically controlled apparatus. In FIG. 8, reference numeral 1 denotes a numerical control section, 2 denotes a storage section in which machining programs and various parameters are stored, 3 denotes a display control section for outputting various machining information based on the machining programs and various parameters to a display section 4, having a CRT monitor, and 5 denotes an operation section which is integrally provided with the display section 4. Various operations performed on an NC apparatus, using a machine tool, are input to the numerical control section 1 by way of an operation control section 6. Reference numeral 7 denotes an axis drive section for each of the axes of a machine tool 8 which controls the driving of each axis on the basis of machining data obtained from computations made by the numerical control section 1. The machine tool 8 is provided with two tool turrets 17 and 18, each having one or more tools that are rotatable about an axis into a machining position. A workpiece 16 is mounted on a so-called C axis, which is a main axis of the machine tool 8. The tool turret 17 has axes X1 and Y1, and the other tool turret 18 has axes X2 and Z2. The tool turrets are selectively moveable in their axial directions to permit selected tools to engage the workpiece and perform a desired machining operation.

The conventional NC apparatus is constructed as described above. The numerical control section 1 reads out and analyzes machining programs which have been previously stored in the storage section 2, determines the movement quantity of each axis, and outputs it to the axis drive section 7. The axis drive section 7 controls the machine tool 8 to perform a desired machining on the workpiece 16. Specifically, section 7 converts the axis movement quantity into drive signals that can drive a motor section (not shown) disposed in the machine tool 8 in order to rotate the workpiece 16 and move the tool turrets 17 and 18 according to the stored programs.

At the same time, the numerical control section 1 determines the current position of each axis in the coordinate system, on the basis of the previous axis position and axis movement quantity, and displays this position data on the display section 4 by way of the display control section 3. That is, axis names 9 and data 10 indicating the current position of each axis corresponding to a name of the axis are displayed by the display section 4.

Concerning the movement instruction to each axis, the arrow direction is denoted as + and its opposite direction as − in FIG. 8. Since the position data 10 matches the instruction of the machining program, the data 10 shows only the current position of each axis that increases or decreases in accordance with the + or − instruction in the coordinate system of the machine tool.

The rotation of the workpiece 16 is represented by the movement about the C axis. Rotation is to the right (clockwise) for the + instruction and to the left (counterclockwise) for the − instruction.

In the above-described conventional NC apparatus, there has been a disadvantage in that, when an operator desires to confirm the operating status of a machine tool on a display section, he cannot know immediately in which direction each axis of the machine tool has actually moved and, therefore, sometimes he must confirm the operating status of the machine tool by direct inspection of the tool. In particular, where a certain axis of a machine tool operates in a wrong direction because an error has been made regarding the instruction direction of a machining program, a problem arises in that it is difficult to know that the machine tool is operating in a wrong direction from the display of the current position by the display section. Similarly, if the motor is faulty, the machine may not respond correctly, in the manner commanded by the programs. Of course, where there are keyboard inputs to control the movement of the tools or workpiece, errors can easily occur which cause the machining to proceed in the wrong direction.

Even if the above errors may be detected by an automatic detector that can give an alarm, often the operator will be quicker to recognize the mistakes than a detector with pre-programmed limits.

The present invention has been devised to solve the above-mentioned problems.

Accordingly, an object of the present invention is to provide a machining apparatus having a display, and method therefor, which provides an operator with the operating status of each axis of a machine tool such that it can be identified rapidly and accurately.

SUMMARY OF THE INVENTION

The machining apparatus of the present invention comprises an axis movement direction creation section for determining the movement direction for each axis, which direction is based on a movement quantity that is computed by a numerical control section, an axis movement symbol storage section in which axis movement symbols conveying directivity are stored, and an axis movement symbol creation section that selects, from the storage section, axis movement symbols which match the direction of axis movement determined by the axis movement direction creation section.

The NC apparatus also comprises an axis movement direction creation means that determines the direction of the movement of each axis on the basis of the axis movement quantity of each axis, which quantity is computed by a numerical control section, an axis speed data creation means that determines the speed of the movement of each axis on the basis of the axis movement quantity, an axis movement symbol storage section in which axis movement symbols that convey directivity and speed are stored, and an axis movement symbol creation means that selects, from the storage section, axis movement symbols which match the direction of axis movement and axis movement speed determined respectively by the axis movement direction creation means and the axis speed data creation means.

In the NC apparatus constructed as described above, since axis movement symbols, conveying at least directivity information, as well as characters identifying the current position corresponding to the axis movement quantity of each axis, are displayed on the display section, the direction of movement of an axis can be identified easily by an operator.

In addition, since axis movement symbols, having directivity and speed components, as well as characters identifying the current position corresponding to the axis movement quantity of each axis, are displayed on the display section, both the direction of movement and the speed of an axis can be easily identified by an operator.

BRIEF DESCRIPTION OF THE DRAWINGS

FIG. 8 is a schematic configurational view illustrating a conventional NC apparatus.

DESCRIPTION OF THE PREFERRED EMBODIMENTS

Figure 1:
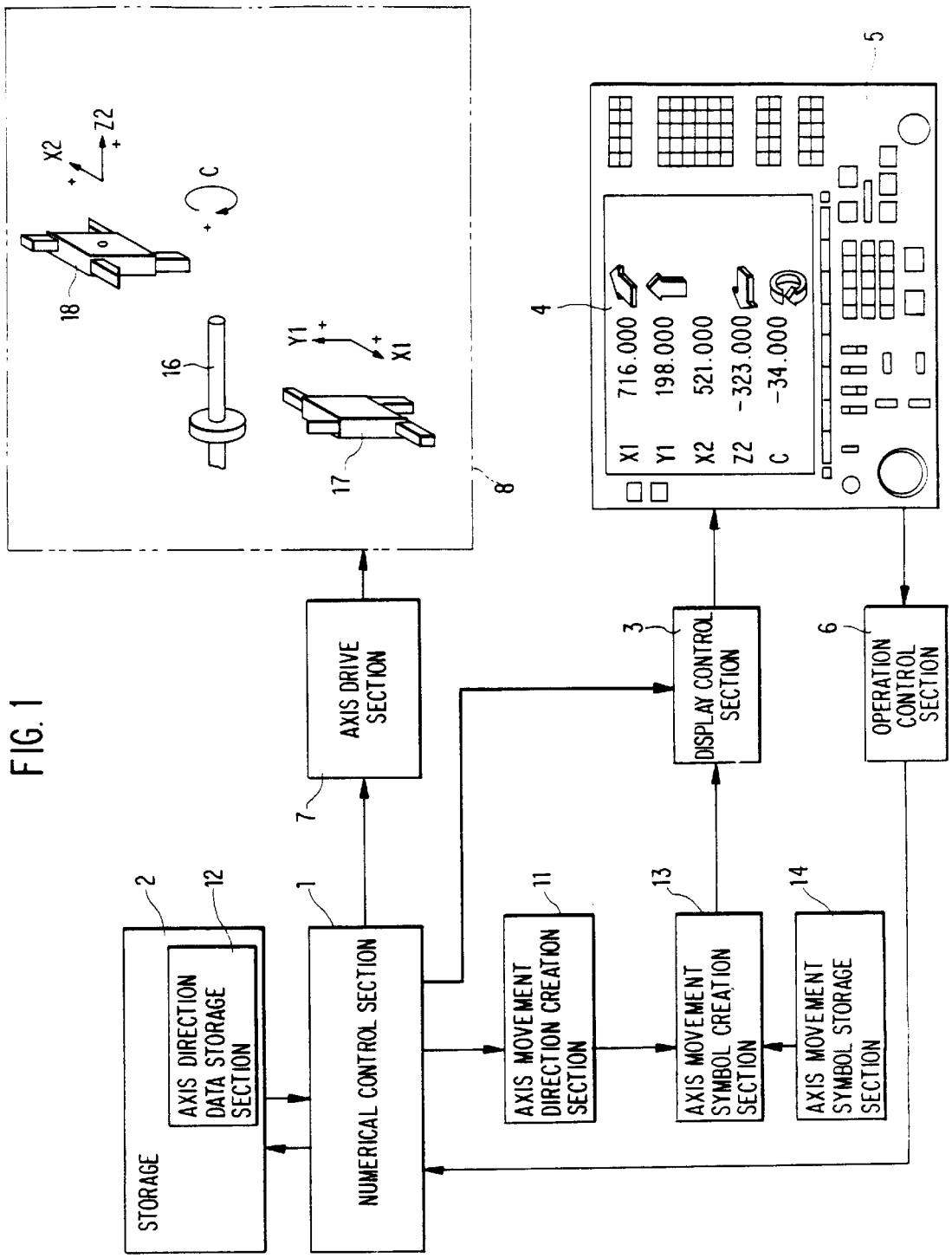
FIG. 1 is a schematic configurational view illustrating a first embodiment of the present invention.
Figure 3:
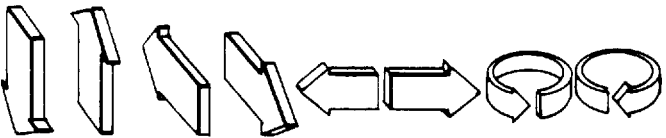
FIG. 3 is a view illustrating an input screen from which the directions of axis movement are input in the first embodiment of the present invention.

FIG. 1 is a schematic configurational view illustrating a first embodiment of the present invention. Reference numerals 1 to 10 and 16 to 18 refer to parts which are substantially the same as the corresponding parts in the above-described conventional apparatus. Reference numeral 11 denotes an axis movement direction creation section that determines the direction of the movement of each axis. That determination is made on the basis of an analysis of the axis movement quantity, using machining programs, by the numerical control section 1. Reference numeral 12 denotes an axis direction data storage section in which the direction of the movement of each axis of the machine tool 8 is stored. This direction is set by the operation section 5, using the position at which an operator is positioned with respect to the machine tool 8 as a reference. A part of the storage section 2 is used as the storage section 12, which could also be separate. Reference numeral 13 denotes an axis movement symbol creation section that reads out an applicable axis movement symbol from an axis movement symbol storage section 14 on the basis of the output of the axis direction creation section 11 and outputs it to the display control section 3. Various kinds of symbols, such as arrows indicating right and left, back and front, and up and down directions, and rotation to the right or left, as shown in FIG. 3, are previously stored in the axis movement symbol storage section 14.

The operation of this embodiment will now be explained. The operations by the numerical control section 1 for reading out and analyzing machining programs from the storage section 2 to control the axis drive section 7 of the machine tool 8 and to display the movement quantity of each axis on the display section 4 by means of the display control section 3 are the same as those performed by a conventional apparatus.

Figure 2:
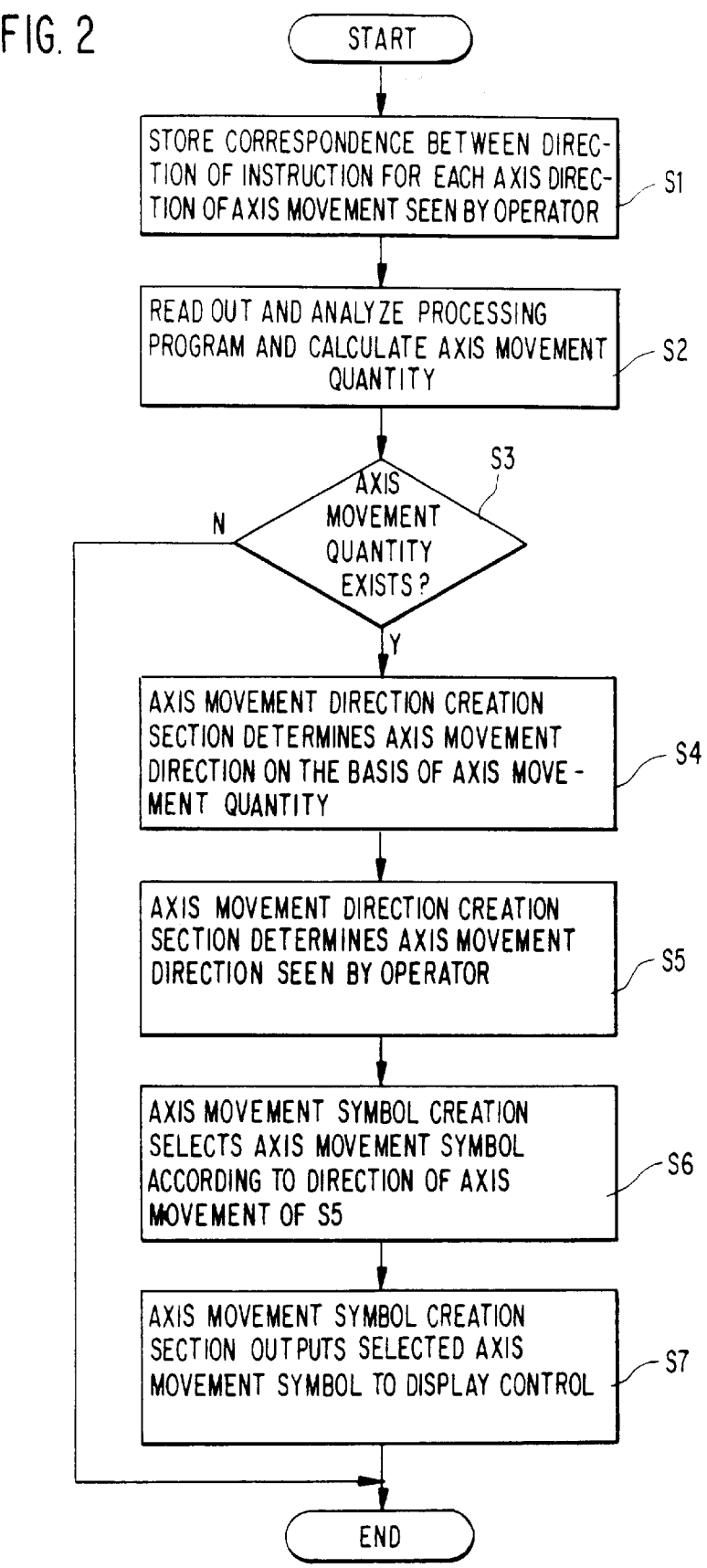
FIG. 2 is a flowchart of the first embodiment of the present invention.

Next, the axis movement symbol display function of this invention will be explained with reference to the flowchart in FIG. 2.

Before the machine tool 8 is operated, a correspondence between the direction of movement instruction to each axis of the machine tool 8 and the direction of the actual movement of each axis of the machine tool 8 seen by an operator is input from the operation section 5. The correspondence is stored beforehand in the axis direction data storage section 12 of the storage section 2 (step S1). In order to provide this correspondence effectively, an input screen, as shown in FIG. 3, is displayed. Then, instructions for the various movements of the axes are input and the operator examines the machine's response and identifies a symbol that corresponds to that response. Specifically, when a movement instruction of the + direction is made for each axis, the operator, while observing the screen of the display section 4, inputs data, one after the other, concerning which direction, as seen by the operator, each axis of the machine tool 8 actually moves.

Thereafter, when the operation is started by the operation section 5, the numerical control section 1 reads out and analyzes machining programs from the storage section 2 and computes the axis movement quantity (step S2). The presence or absence of this axis movement quantity is determined (step S3). In the case where it is present, the axis movement direction creation section 11 determines the direction of the movement of each axis based on the sign of the axis movement quantity (step S4). The axis movement direction creation section 11 further determines the direction of the movement of each axis of the machine tool 8 seen by the operator on the basis of the direction of the axis movement determined in step S4 and data of the axis direction data storage section 12, which data has been previously input in step S1 (step S5). Next, the axis movement symbol creation section 13 selects arrow symbols that respectively match the direction of the movement of each axis, as determined in step S5, from the axis movement symbol storage section 14 (step S6). These arrow symbols are displayed on the display section 4 by means of the display control section 3 (step S7).

Figure 4:
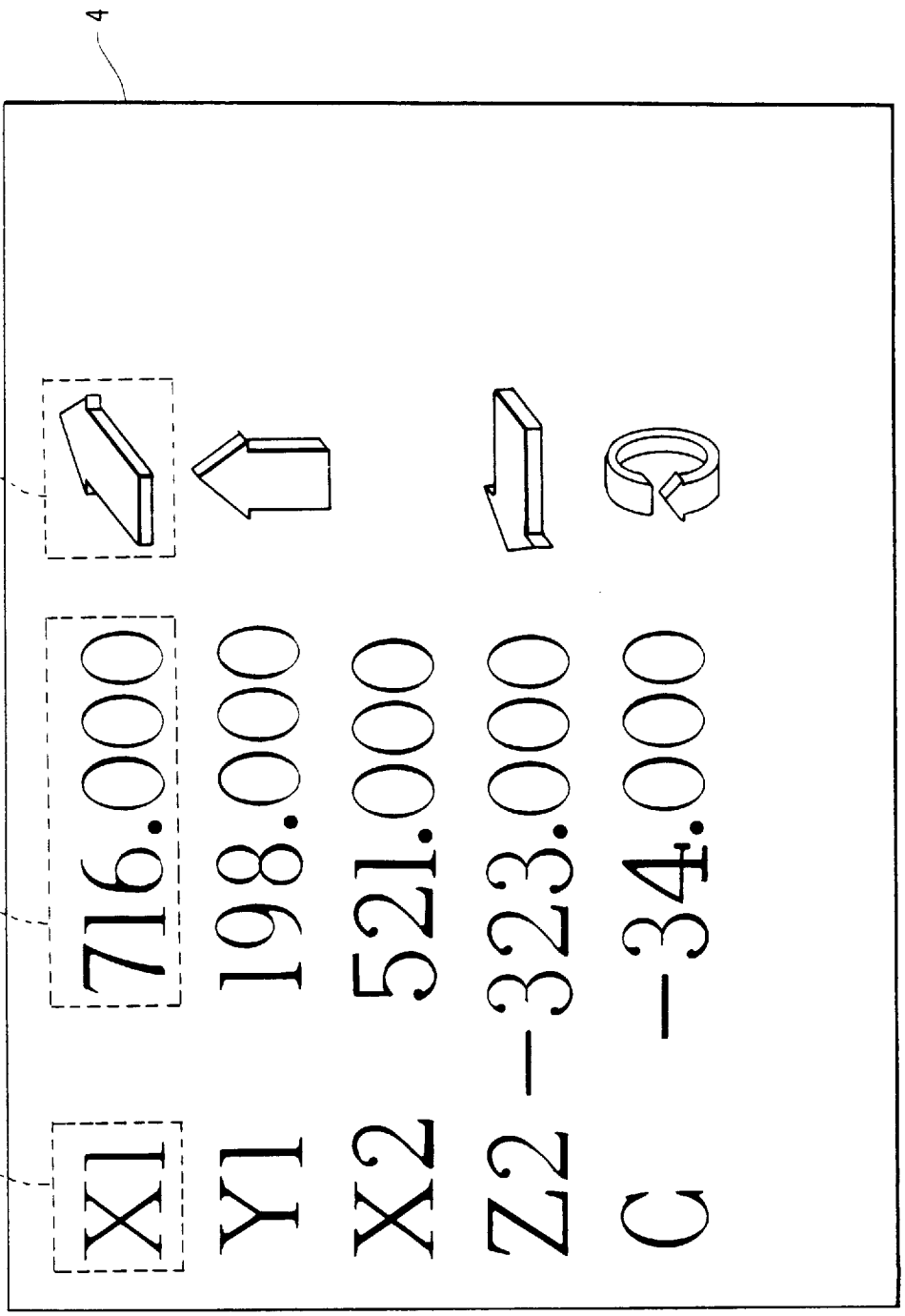
FIG. 4 is a view showing a specific example of the display section in the first embodiment of the present invention.

As a result, as shown in FIG. 4, axis names 9, position data 10 indicating the current position of each axis, and the direction of the actual movement of each axis seen by the operator, are simultaneously displayed on the display section 4. From this display, at least the direction of the movement of each axis can be identified accurately and easily due to the arrow symbols.

Figure 5:
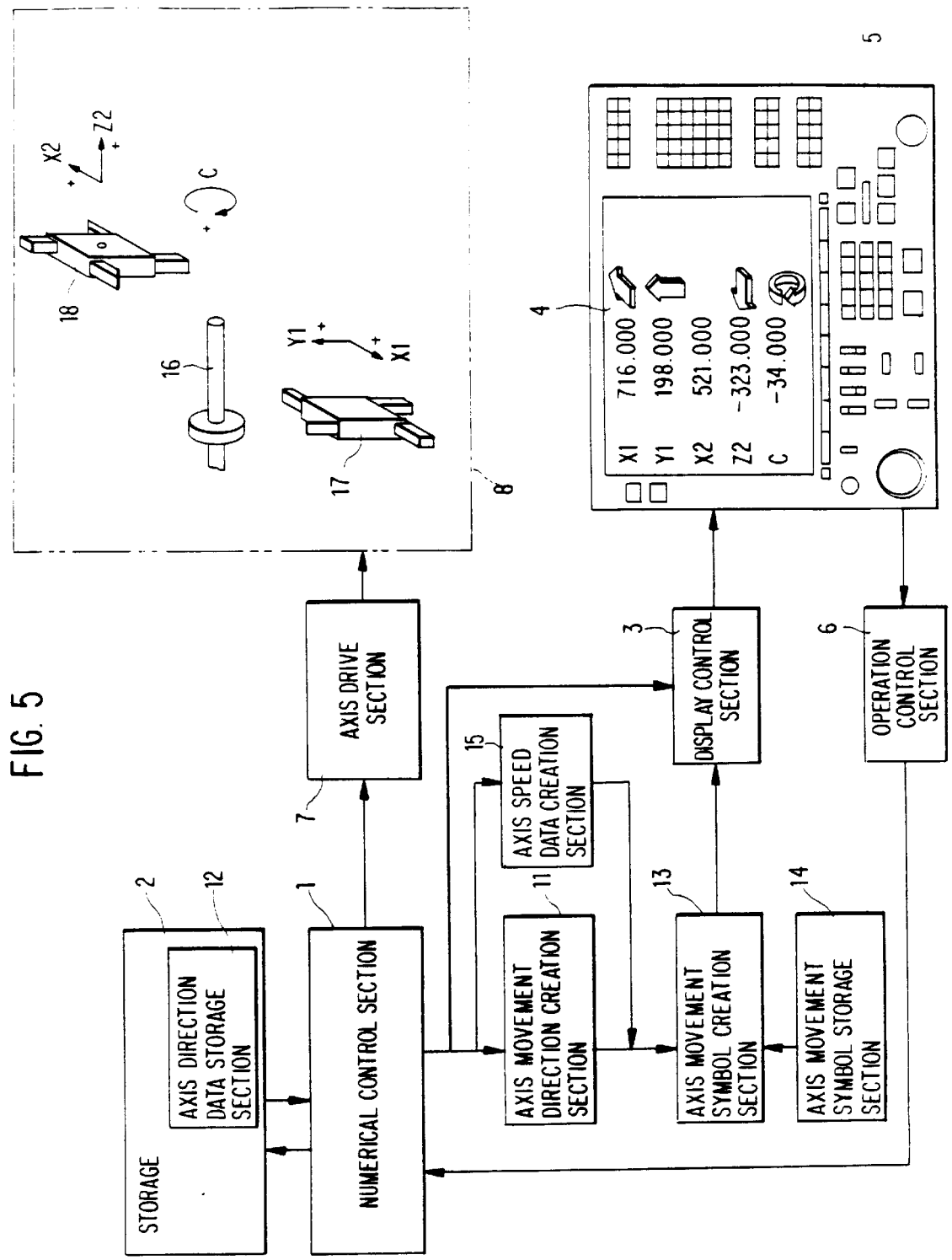
FIG. 5 is a schematic configurational view illustrating a second embodiment of the present invention.
Figure 6A:
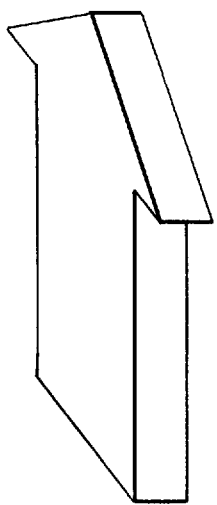
FIG. 6 is a view illustrating arrow symbols in the second embodiment of the present invention.
Figure 6B:
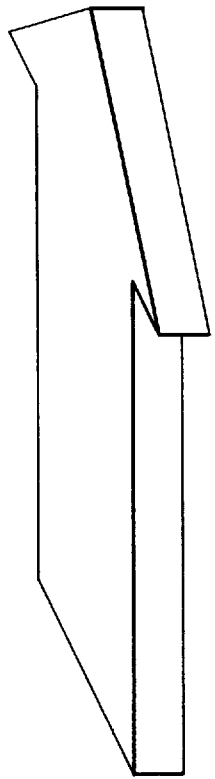
Figure 6C:
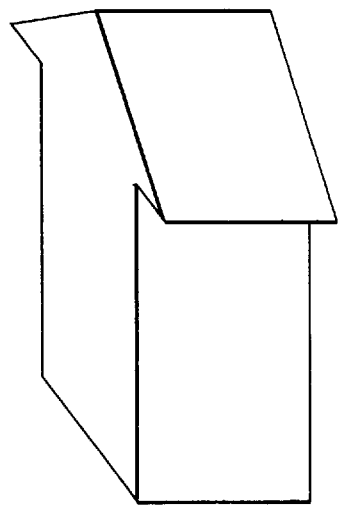

In FIG. 5, reference numerals 1 to 13 and 16 to 18 refer to parts which are substantially the same as the corresponding parts of the first embodiment. Reference numeral 15 denotes an axis speed data creation section that determines speed data on the basis of the axis movement quantity output of the numerical control section 1. Stored in the axis movement symbol storage section 14 are arrow symbols indicating changes in speed as well as the direction of movement. For example, a plurality of different kinds of arrow symbols whose respective lengths and thicknesses are changed according to the speed of the movement, as shown in FIG. 6, may be stored.

Figure 7:
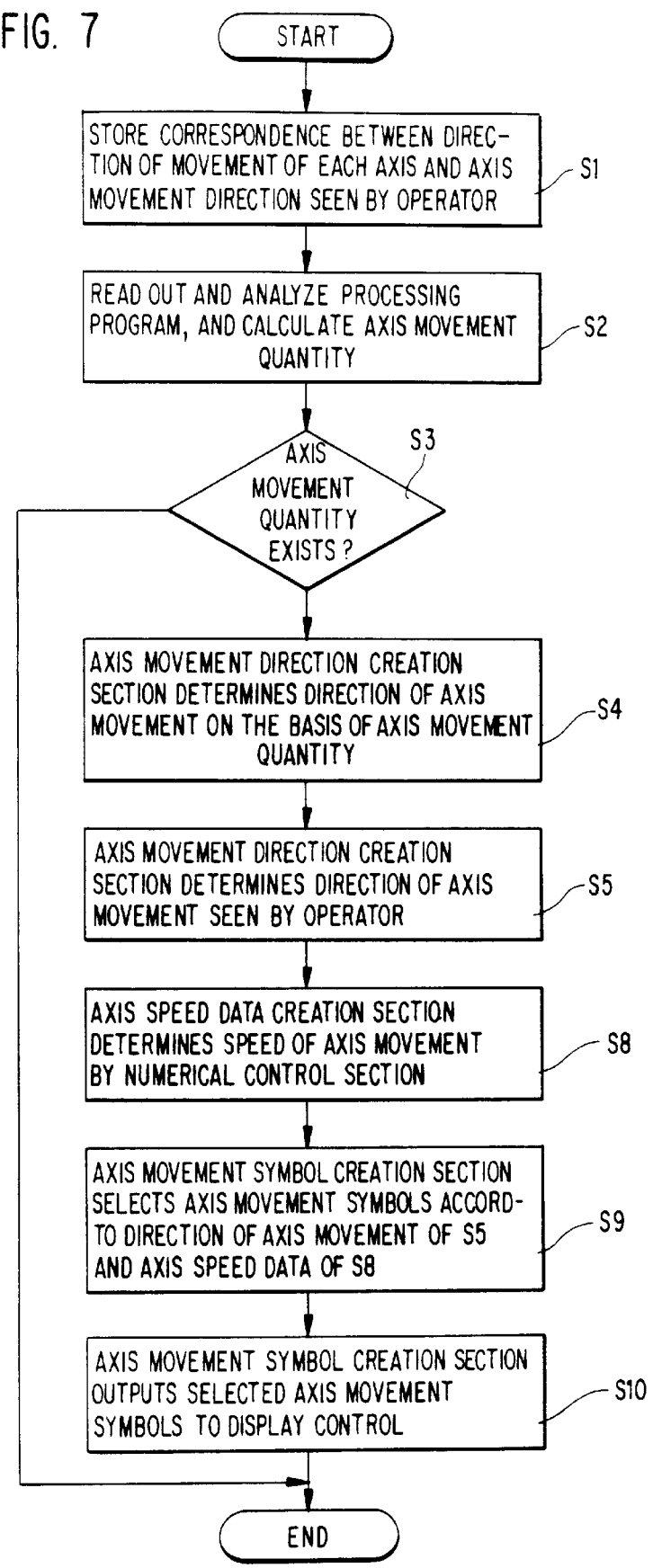
FIG. 7 is a flowchart of the second embodiment of the present invention.

The axis movement symbol display function, in which the speed component of the axis movement quantity is taken into account, will be explained with reference to the flowchart of FIG. 7. Steps S1 to S5 are the same as in the first embodiment. Thereafter, in step S8, the axis speed data creation section 15 converts the axis movement quantity, which the numerical control section 1 outputs to the axis drive section 7, into a value of axis speed, e.g., movement quantity (mm) per unit of time (minutes).

Then, in step S9, the axis movement symbol creation section 13 selects, from the axis movement symbol storage section 14, arrow symbols whose sizes are proportional to speed data according to the direction of the movement of each axis determined in step S5 and the speed data of the movement of each axis determined in step S8. These selected arrow symbols are displayed on the display section 4 by way of the display control section 3 (step S10).

In the first and second embodiments, the direction of the movement of each axis is indicated by an arrow symbol and its size is changed in proportion to speed. The shade, color, or brightness of a symbol, each of which is allowed to undergo a change on a display section, may also be used to indicate changes in magnitude or even direction.

Mechanical elements such as tool turrets, which can be moved by each axis of a machine tool, may be graphically displayed directly on a display section, and the direction of movement of each of the mechanical elements may be displayed in the manner described above. Thus, according to the present invention, movement status can be identified quite easily.

Since the present invention is constructed as explained above, the operation of each axis of a machine tool, including the direction of its movement, can be displayed, and the operation of each axis can be learned speedily and accurately.

Clearly, the invention has applications beyond the preferred embodiments. For example, it applies as well to embodiments where the tool is stationary and the workpiece moves, or where both are moved. Further, the symbols used to convey the information concerning speed and direction may be made more complicated and may consider other parameters as the cost of display processing and memory is reduced in the future. Also, while the preferred embodiment stores the several symbols individually in a look-up table type memory, the stored information can be logically combined to create the display, as where color or texture is added to a direction symbol. Moreover, the invention may be applied to debugging processes as well as on-line manufacturing, as herein disclosed.

The entire disclosure of each and every foreign patent application from which the benefit of foreign priority has been claimed in the present application is incorporated herein by reference, as if fully set forth.

Although this invention has been described in at least one preferred form with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. A program-controlled machining apparatus having at least one of a moveable tool and a moveable workpiece, said movement being effected by at least one axis, comprising:
    a machining section for computing an axis movement quantity for at least one of said axes on the basis of machining programs;
    axis movement direction creation means for determining the direction of the movement of each axis on the basis of said axis movement quantity;
    axis movement symbol storage means for storing axis movement symbols comprising directivity information;
    axis movement symbol creation means for selecting, from said storage section, axis movement symbols that match the direction of axis movement determined by said axis movement direction creation means; and
    display means for displaying at least said selected axis movement symbols.

2. The apparatus of claim 1, wherein plural axis information is concurrently displayed.

3. The apparatus of claim 1 further comprising means for combining said current position of each axis with said symbols for display.

4. The apparatus of claim 3, wherein at least one of said movement quantity and movement direction is displayed by variations in at least one of color, size and shape.

5. A numerically controlled apparatus having a plurality of moveable axes, each being controlled by at least one machining program, comprising:
    a numerical control section for computing the axis movement quantity of at least one axis on the basis of said at least one machining program;
    axis movement direction creation means for determining the direction of the movement of said axis on the basis of said axis movement quantity;
    axis speed data creation means for determining the speed of axis movement on the basis of said axis movement quantity;
    an axis movement symbol storage section in which axis movement symbols representing axis directivity and speed are stored;
    axis movement symbol creation means for selecting, from said storage section, axis movement symbols that match the direction and speed of axis movement determined respectively by said axis movement direction creation means and axis speed data creation means; and
    a display section for displaying said current position of said axis on the basis of said axis movement quantity and said selected axis movement symbols.

6. The apparatus of claim 5, wherein at least one of said movement quantity and movement direction is displayed by variations in at least one of color, size and shape.

7. The apparatus of claim 5, wherein display section comprises means for displaying concurrently information for a plurality of said axes.

8. A method of identifying the operation of a program-controlled machining apparatus having at least one of a moveable tool and moveable workpiece comprising:
    determining the movement quantity of said at least one of a tool and a workpiece;
    determining the movement direction of said at least one of a tool and a workpiece on the basis of said movement quantity;
    storing movement symbols having at least directivity information;
    selecting from among said stored movement symbols a symbol that matches said determined movement direction; and
    displaying said selected symbol.

9. The method of claim 8, wherein said displaying step further comprises displaying information identifying said at least one of a tool and a workpiece and the current position of said at least one of a tool and a workpiece.

10. The method of claim 8, further comprising:
    determining the speed of said at least one of a tool and a workpiece; and
    wherein said storing step further comprises storing symbols that contain speed information and said selecting step further comprises selecting a symbol that substantially matches said determined speed.

11. The method of claim 8, wherein said machining is one of a NC programmed or PC programmed machining.

12. A method of identifying the movement of at least one of a moveable tool and a moveable workpiece, having at least one axis for effecting movement, comprising:

storing axis movement symbols representing directivity and speed;

computing an axis movement quantity for said axis on the basis of machining programs;

determining the direction of the movement of said axis on the basis of said axis movement quantity;

determining the speed of axis movement on the basis of said axis movement quantity;

selecting from among said stored symbols, axis movement symbols that substantially match said determined direction and speed of axis movement; and displaying said selected axis movement symbols.

13. The method of claim 12, wherein said displaying step further comprises displaying the current position of said axis.

14. The method of claim 12, wherein said machining is one of a NC programmed or PC programmed machining.

15. The method of claim 12, wherein said storing step is based on operator-positioned observations of axis movement.

16. The method of claim 12, wherein the movement of plural axes are displayed.

17. The method of claim 12, wherein said symbols comprise arrows.

* * * * *